United States Patent

[11] 3,573,728

[72] Inventors Eugene Kolankowsky
Pleasant Valley;
August K. Pattin, Jr., Wappingers Falls, N.Y.

[21] Appl. No. 790,142
[22] Filed Jan. 9, 1969
[45] Patented Apr. 6, 1971
[73] Assignee International Business Machines Corporation
Armonk, N.Y.

[54] MEMORY WITH ERROR CORRECTION FOR PARTIAL STORE OPERATION
10 Claims, 2 Drawing Figs.

[52] U.S. Cl. .......... 340/146.1, 340/172.5
[51] Int. Cl. .......... H04l 1/10, H04b 3/46, G08g 25/00
[50] Field of Search .......... 340/146.1; 235/153

[56] References Cited

UNITED STATES PATENTS 3,119,098 1/1964 Meade .......... 340/146.1X
3,474,412 10/1969 Rowley .......... 235/153X

OTHER REFERENCES

Stojko, Jr. et al. Error-Correction Code. In IBM Tech. Discl. Bull. 10(10): p. 1437— 1438. March 1968. TK7800.I13

*Primary Examiner*—Malcolm A. Morrison
*Assistant Examiner*—R. Stephen Dildine, Jr.
*Attorneys*—Hanifin and Jancin and William S. Robertson

ABSTRACT: This invention provides coding circuits for storing words in a memory in an error correction code and for operating with an associated system in which data is provided with error detecting parity check bits. The coding circuits include means for locating an incorrect bit of a memory word and for updating the error correction bits to correspond to the corrected word.

INVENTORS
EUGENE KOLANKOWSKY
AUGUST K. PATTIN, JR.
BY W S Robertson
ATTORNEY

MEMORY WITH ERROR CORRECTION FOR PARTIAL STORE OPERATION

RELATED APPLICATIONS

Application Ser. No.: 759,972 of J. W. Kurtz and A. K. Pattin, assigned to the assignee of this invention, discloses an improvement to the error correction system of this invention.

INTRODUCTION

It will be helpful to review some of the general features of memories and error checking circuits that apply to this invention. A memory stores binary data in units called words. Each word of a memory ordinarily has the same number of bit positions. In the specific memory that will be described later, each memory word has 72 bit positions that store 64 data bits and 8 check bits. In the system associated with the memory the memory word is divided into smaller units that are called bytes. In the example there are 8 data bits and 1 check bit in each byte. In various operations in the associated system, a byte can be an independent unit of data or a number of bytes can be handled as a single unit of data. Thus, although a memory operation takes place on an entire word at a time, the system associated with the memory may receive only selected bytes of the word and it may provide one or more bytes to be stored in the memory. The byte locations of a memory word are identified by a Mark register and byte positions that are to be stored are identified by a 1 in the corresponding position of the Mark register.

Such a memory performs store, fetch and partial store operations. In a store operation a new word of data is written into an addressed location of the memory. In a ferrite core memory the write operation is preceeded by an operation to erase the word that was previously stored in the addressed location. In the memory of this invention a store operation is accompanied by a coding operation that provides check bits that are stored with the data in the addressed word of the memory (or in a special memory). In a fetch operation the addressed word is read from the memory and all the bytes of the word are transmitted to the associated system. In most ferrite core memories the read operation erases the addressed word and a write operation follows to regenerate the word in the memory. In such a memory the fetch and store operations are broadly similar and begin with a read or erase phase and end with a write or regenerate phase. In semiconductor flip-flop memories and other memories that may use this invention the read phase of a fetch operation does not erase the addressed word, and the write phase of store operation may not require a preceeding erase phase. In a partial store operation, the marked bytes and check bits are erased and new data is written in and the unmarked bytes are read and regenerated or are read nondestructively.

In the application for which this invention is particularly intended, the memory word carries error-correcting code bits but in the associated system each byte carries a parity bit that provides single error detection. Or, more generally, the memory and the associated system operate in different codes. Thus, a store operation and a fetch operation are quite different with respect to the coding circuits. A fetch operation gives data that is to be supplied to the associated system (along with a parity bit for each byte) and check bits from which the data can be corrected. A store operation provides data that can be parity checked but not corrected. A general object of this invention is to provide a new and improved coding circuit that performs these diverse operations which occur simultaneously in a partial store operation.

SUMMARY OF THE INVENTION

This invention provides a register called a Fetch Register that receives a word read from the memory and it includes a register called a Store Register that receives a word that is to be written into the memory. In a store operation, the word in the store register is supplied by the associated system and in a fetch operation the word in the store and in the fetch register is supplied by the memory. In a partial store operation the marked bytes in the store register are supplied by the associated system and the unmarked bytes are supplied by the memory. An encoding circuit is provided for generating check bits according to the data in the store register and the check bits are stored in the addressed location of the memory. A decoding circuit is provided for locating errors in the word in the fetch register and for correcting errors and supplying the corrected word and suitable parity bits to the associated system. In a partial store operation a full word is entered into the fetch register and corrections are made in the store register when an error is found in an unmarked byte. After a correction to the store register, the check bits must be changed to correspond to the new word. Means, called an ECC Reconfigurator, is provided for changing the check bits according to signals generated by the error-locating circuits. The operation of the ECC Reconfigurator is significantly faster than the operation of reencoding a new set of check bits from the corrected word in the store register.

More specifically, the ECC generator itself forms Exclusive OR operations on the data bits and in this encoding operation the signals are transmitted through a relatively long succession of logic circuits. The error-locating circuits provide the location of the check bits that are to be changed in a more readily decodable form.

The foregoing and other objects, features and advantages of the invention will be apparent from the following more particular description of a preferred embodiment of the invention, as illustrated in the accompanying drawings.

THE DRAWINGS

THE EMBODIMENT OF THE DRAWING

Figure 2:
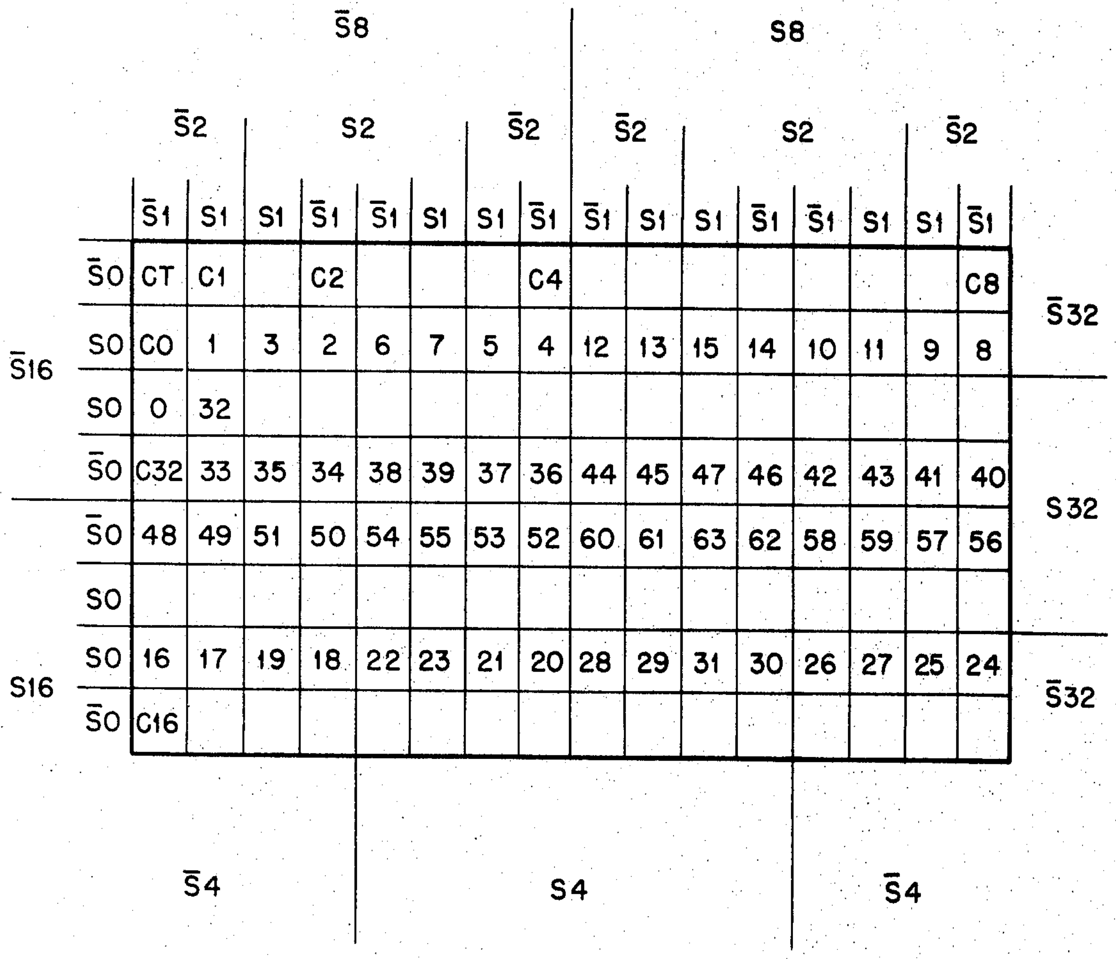
FIG. 2 shows a syndrome decoding table of a well known error correction code that is used in the preferred embodiment of the invention.

The Error Correction Code Of FIG. 2

Figure 1:
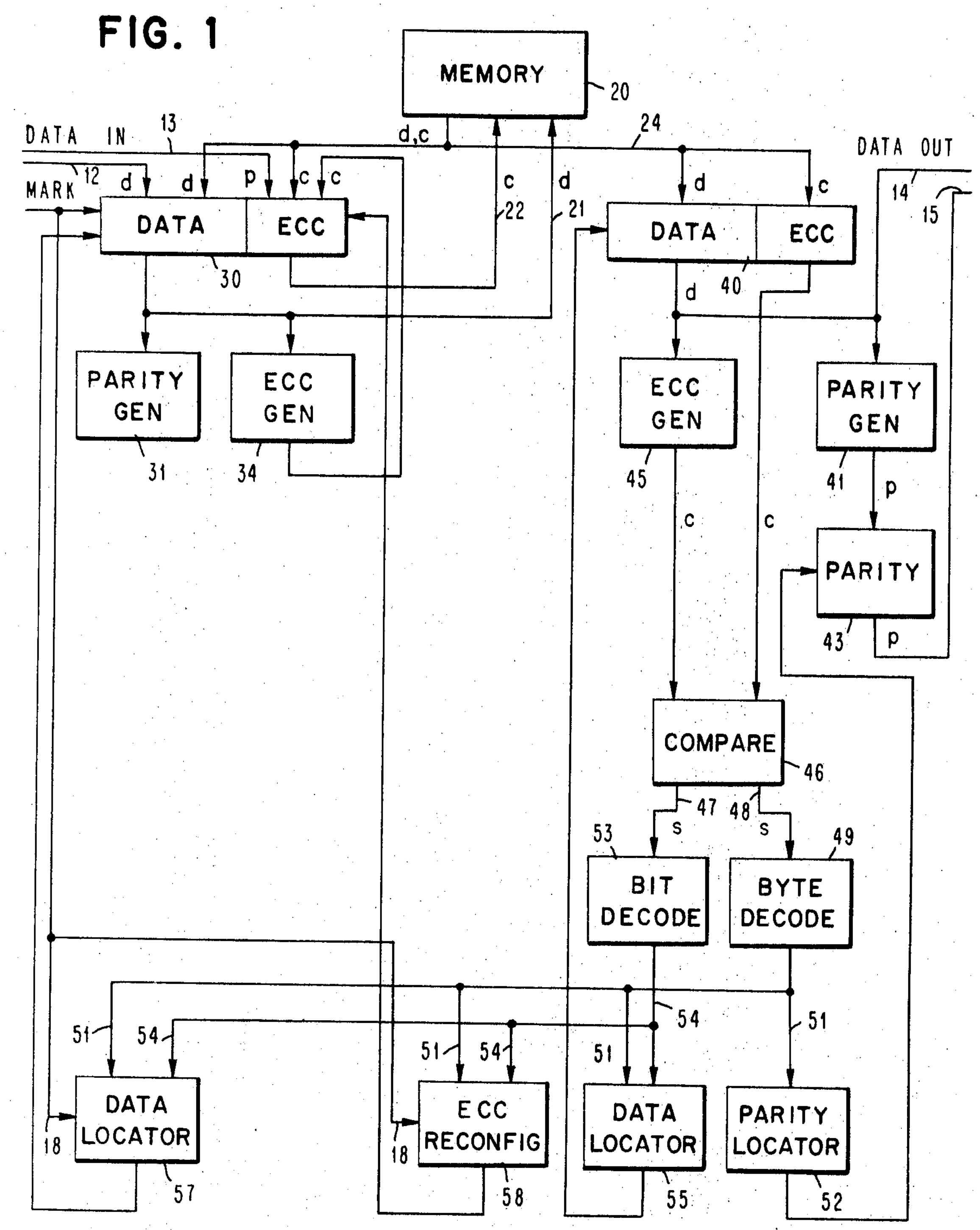
FIG. 1 is a block diagram of the preferred embodiment of the invention.

Although the error correction code of FIG. 2 is well known, a detailed explanation of the code will be a helpful introduction to the encoding and decoding circuit of FIG. 1. FIG. 2 is a Karnaugh map in which the column headings are 4 syndrome bits, S1, S2, S4 and S8 and the row headings are 3 syndrome bits S0, S16 and S32. A syndrome bit is the result of a comparison of a check bit that is read from the memory with a check bit that is generated by reencoding the memory word. A difference between two check bits causes the corresponding syndrome bit to be a 1. For most bit positions the 6 syndrome bits S32, S16, S8, S4, S2, S1 form a binary number that identifies the incorrect bit position in the memory word. The number subscripts of the syndrome bits provide a simple conversion to the corresponding decimal number.

Each location on the map represents a unique combination of the syndrome bits and the map shows the decimal number of the corresponding data bit position. For example, data bit position 24 is shown near the lower right-hand corner of the map where these 6 syndrome bits form the pattern 011000. The code is arranged so that the syndrome bits for each data bit position have a 1- and at least 2-bit positions. As will be explained later, the code thereby provides that a 1 in bit CT and in a single other syndrome bit position signifies that an error has occurred only in a check bit position. The syndrome bit S0 provides for distinguishing data bits 0 and 32. As the map shows, bit position 0 is represented by the 7-bit sequence 1000001, and bit position 32 is represented by the 7-bit sequence 1000011.

Except for byte 0 which contains data bit 0 and bite 4 which contains data bit 32, all the bits of each byte are located on the map to be identified by the 3 syndrome bits S32, S16 and S8, plus bit S0. For example, data bits 8 through 15 form byte 1 and are identified by the pattern 001 of bits S32, S16 and S8. As the map shows, these 3 syndrome bits do not completely define byte 0 and byte 4. The difference in coding and decoding these two bytes and the bit positions 0 and 32 is significant in understanding some of the components that will be described later.

The check bits are shown on the map as C32, C16, C8, C4, C2, C1, C0 and CT. The check bits are not encoded and a 1 in bit CT and only one other syndrome bit position signifies that a check bit is an error. For example, an error in check bits C8 in the upper right hand corner of the map produces the syndrome pattern 0010000 in which only syndrome bit S8 is a 1. Check bit CT forms a parity check on all 71 other bits of a memory word for identifying that an error has occurred in two bit positions.

Introduction To FIG. 1

The memory system of the drawing receives data to be stored on a data in bus that is shown in two parts 12 and 13 that carry data bits and parity bits respectively. The letter *d* which signifies data bits on line 12 and the letter *p* which signifies parity bits are used similarly elsewhere in the drawing. Other lines in the drawing carry the legend *c* to signify check bits and *s* to signify syndrome bits. Data stored in the memory system is supplied on a data out bus that is shown as two separate lines 14 and 15 that carry data bits and parity bits respectively. The memory also receives a mark signal on a line 18. Data is stored in a memory 20 which is preferably a large capacity ferrite core memory but may be of any technology. The circuits that will be described later supply memory 20 with data to be stored on a line 21 and error correction bits on a line 22. The data stored in the memory is conventionally read and made available on a line 24. In the embodiment of the drawing, the word on line 24 is supplied by sensing circuits in memory 20 and the word on lines 21 and 22 is applied to inhibit drivers or to other circuits of the memory that control a write operation. Alternatively, the memory may include registers that receive a word from the sense amplifiers to be thereafter applied to line 24 and to receive the input word on lines 21 and 22 to be thereafter applied to the write circuits.

The circuit as it has been described so far is conventional and illustrates a wide variety of applications for this invention. The components of the error correction circuits will be described as they appear in the operation of encoding data to be stored in the memory, forming syndrome bits, decoding the syndrome bits, and reconfiguring the ECC bits that are to be stored in the memory.

Encoding A Store Or Partial Store Operation

For a store operation, a new word of data is to be stored in the memory and the word previously stored at the addressed location is erased. The memory includes a register 30 that is wide enough to hold a word from the memory or from the associated system. It is divided functionally into a data section and an ECC section. During the store operation, the mark signal on line 18 controls register 30 to accept a whole word on line 12 and 13. For the example of a word of 64 data bits and 8 check bits, the number of parity bits conveniently equals the number of error correction code bits. The data on line 12 is entered into the data section of register 30. The parity bits are entered into the ECC section of the register for the purpose of performing the parity check on the incoming data. A conventional parity generator 31 is provided which generates the parity bits for this check.

An error correction code generator 34 is connected to receive the output of the data portion of register 30 and to provide error correction code bits at its output. ECC generator 34 is preferably made up of conventional Exclusive OR circuits interconnected to form 8 check bits according to the following table.

$$C0=\sum_{x=0}^{32}+\mathrm{i}x+1$$

$$C1=\sum_{x=1}^{32}+i(2x-1)+i32+1$$

$$C2=\sum_{x=0}^{15}+[i(4x+2)+(4x+3)]+1$$

$$C4=\sum_{x=0}^{7}+[i(8x+4)+i(8x+5)+i(8x+6)+i(8x+7)]+1$$

$$C8=\sum_{w=8}^{15}+\mathrm{i}w+\sum_{x=24}^{31}+ix+\sum_{y=40}^{47}+\sum_{z=56}^{63}+iz+1$$

$$C16=\sum_{x=16}^{31}+ix+\sum_{y=48}^{63}+\mathrm{i}y+1$$

$$C32=\mathrm{i}o+\sum_{x=32}^{63}+ix+1$$

$$CT=io+[\sum_{x=0,\,8,\,32,\,40}+(i_{(x+8)}+i_{(x+11)}+i_{(x+13)}+\mathrm{i}_{(x+14)})+\sum_{y=0,\,24,\,32,\,56}+i_{(y+1)}+i_{(y+2)}+i_{(y+4)}+i_{(y+7)}]$$

In the table the sign + signifies the Exclusive OR operation and the term *i* is a bit position identified by the subscript. For example, bit C0 is the Exclusive OR function of data bits 0 through 32 and the constant 1 (which produces ODD parity). The table is based on FIG. 2. For example, check bit C0 is formed as the Exclusive OR function of all the data bits located in rows where syndrome bits S0 is a 1, that is, bits 0 through 32 as the table indicates.

When the error correction bits are formed (and the parity check is completed), the ECC bits are stored in the ECC portion of register 30. The data from register 30 is applied to input line 21 of the memory 20 and the ECC bits from the register are applied to input 22 and the word is written into the memory.

The circuit just described also operates to encode data from the memory for a fetch operation. The mark signal on line 18 controls register 30 to receive the memory word on line 24 in the way already described for receiving data and parity bits on lines 12 and 13. Since the memory word contains ECC bits, the encoding operation that was described for the store operation is not necessary; however, it is convenient because it standardizes operation of these circuits for the three different memory operations and it avoids the need to correct for errors found in the ECC bits that are read from the memory.

For a partial store operation, the mark signal 18 controls register 30 to receive the marked bytes on line 12 and the corresponding parity bits on line 13. Register 30 receives the unmarked bytes on line 24 in its other positions. The mark register controls the parity checking operation to take place only on the marked bytes. The ECC generator 34 encodes the new word and provides the new check bits. These check bits are entirely independent of the check bits provided from the memory on line 22.

Syndrome Bit Generation

The system includes a register 40 that has a data section and an ECC section connected to receive a memory word on line 24. Because a full memory word is required for error correction, register 40 receives a full memory word on either a fetch or a partial store operation; to standardize the memory operations, register 40 may also receive a full memory word on a store operation. The output of the data portion of the register 40 is connected to line 14 of the data out bus. This output is also connected to a parity generator 41 which supplies parity bits to a parity register 43 that provides the parity bits on the part 15 of the data out bus. The data portion of register 40 is also supplied to an error correction code generator 45 that is similar to error correction code generator 34.

A compare circuit 46 receives the 8 ECC bits from ECC generator 45 and the corresponding 8 ECC bits from register 40 and forms a bit by bit Exclusive OR comparison of the two sets of ECC bits. Syndrome bits C4, C2 and C1, define which of the 8 data bit positions of a byte is in error and are applied on a line 47 to a bit decode circuit 53. Syndrome bits C32, C16, C8 and C0, which define the byte in which an error has occurred, are applied on the line 48 to a byte decode circuit 49. A syndrome bit ST is formed by comparing bit CT from the ECC generator 45 and the corresponding bit from the register 40 for identifying various error conditions. Means are provided in compare circuit 46 to form the AND function of the complement of this comparison and the OR function of the 7 other syndrome bits. This double error indication is supplied to the associated system and it may be used to inhibit the syndrome decoding circuits from making an invalid correction. A check bit error is identified by a 1 for bit ST and any single other syndrome bit; and bit ST is combined logically with the other syndrome bits to produce a signal to inhibit the syndrome decoding circuits when a check bit error occurs. Errors indicated as occuring in the blank locations of the map of FIG. 2 can be detected as invalid by similar logic.

Syndrome Decoding

Byte decode circuit 49 operates according to FIG. 2 to provide at its output 51 an indication that an error is in a particular half row of the map of FIG. 2. These half rows are defined by logic functions of the 4 syndrome bits S32, S16, S8 and S0. Except for byte 0 and byte 4, these half rows form data bytes. For example, the AND function $\bar{S}32$, $\bar{S}16$, S8, and S0 defines byte 1. However, the AND function S32, $\bar{S}16$, $\bar{S}8$, and S0 defines an error in either bit 0 of byte 0 or bit 32 of byte 4, and the AND functions $\bar{S}32$, $\bar{S}16$, $\bar{S}8$, S0 and S32, $\bar{S}16$, $\bar{S}8$ and $\bar{S}0$ define respectively portions of bytes 0 and 4 and the check bits C0 and C32 of the associated half row.

Parity locator 52 receives the output 51 from byte decode circuit 49 and operates parity register 43 to complement the parity bit that corresponds to the byte where a correction is to be made. For bytes 1, 2, 3, 5, 6 and 7, the output of byte decode circuit 49 is applied directly to the corresponding stage of parity register 43. Parity locator 52 further decodes the output of byte decode circuit 49 to locate errors in bytes 0 and 4. The output S32, $\bar{S}16$, $\bar{S}8$, S0 is ANDed with an output from other error locator circuits that will be described later signifying that an error is in bit position 0. This logic function signifies that an error has occurred in bit 0 of byte 0 and it is ORed with the output S32, $\bar{S}16$, $\bar{S}8$, S0 that identifies the other bit positions of byte 0. Byte 4 is similarly decoded as a function of an error in bit position 1.

Bit decode circuit 53 similarly produces an output 54 signifying that the error is located in one of the 8 columns in either half of the map of FIG. 2. The numbers 0 through 7 show the bit positions of byte 0 and the same pattern applies to the other bytes. For example, the AND function $\bar{S}4$, $\bar{S}2$, $\bar{S}1$ identifies an error in bit position 0 which is the left-handmost column in the left half of the map and the right-handmost column in the right half of the map.

A data locator 55 receives the output of bit decode circuit 53 and byte decode circuit 49 and by simple AND logic functions further decodes these outputs to identify a particular data bit position in register 40 that is in error. Suppose for example that bit 24 near the lower right hand corner of the map is in error. A circuit that is connected to complement bit position 24 of register 40 is connected to receive a single from bit decode circuit 53 that is also applied to the circuits for bit positions 56, 40 and 8 that are located in the same column on the map and to the circuits for bit positions 16 and 48 which are located in the corresponding column in the left-hand half of the map. The circuit for bit 24 also receives a signal from byte decode circuit 49 signifying that byte 3 is in error. The circuits for the other bits of byte 3 receive this signal from the byte decode circuit also. On coincidence of these signals, bit 24 in register 40 is complemented.

A similar data locator 57 corrects data in the store register 30. The output of data locator 57 is controlled according to the mark signal 18 so that corrections are made only in bytes that are read from the memory and the data locator does not make an erroneous correction in bytes received from the data in bus when an error is located in a marked byte from the memory on a partial store operation.

ECC RECONFIGURATION

As the invention has been explained so far, data in register 40 is corrected and applied to the data out bus and parity bits in register 43 are updated to correspond to the change in the data after the parity bits are generated, and data in register 30 is similarly corrected to be restored in memory 20. The ECC bits in register 30 also must be updated to correspond to the change in data. The new bits can be generated by again applying the data portion of register 30 to ECC generator 34 and storing the output of the ECC generator in the ECC portion of register 30. An ECC reconfigurator circuit 58 is provided to update the ECC bits more directly. In the map of FIG. 2 the subscripts of the syndrome bits at the column and row headings define the check bits that enter into the Exclusive OR function of the check bit. For example, all of the data bits on the right-hand half of the map are Exclusive ORed to form check bit C8. A correction to any one of these data bits requires complementing check bit C8 (and other check bits) in register 30. Thus the OR logic function of these outputs from a data locator 55 or 57 would indicate whether check bit C8 requires updating. The error-locating circuits provide a more convenient location of the check bits to be updated. The updating of check bit C8 for example is defined by the OR function of the signals for bytes 1, 3, 5, and 7 at output 51 of byte decode circuit 49 since all of the bits of these four bytes are Exclusive ORed to form check bit C8.

Similarly, check bit C0 is located by the outputs of byte decode circuit 49 that signify errors in the rows where S0 is a 1 in the map of FIG. 2. Check bit C2 is complemented according to the OR function of the outputs of bit decode circuit 53 signifying that an error has occurred in bit positions 2, 3, 6 or 7 since these bit positions in either half of the map coincide with the column headings where S2 is a 1.

The complementing signal for check bit C4 is formed according to a logic function: bit positions 4, 5, 6 or 7. Check bits C16 and C32 can be formed as simple logic functions of byte decode circuit 49 in the way that has been described for the check bit C8.

The mark signal 18 is applied to reconfigurator circuit 58 to prevent an invalid updating operation when the error is in a marked byte and error locator 57 does not change a data bit position in register 30. This logic function is conveniently provided by ANDing the byte identifying signals with the corresponding bit of the marked signal.

For diagnostics it may be desirable to provide a connection (not shown) for storing data in memory 20 from register 40. Further error correction techniques are possible for the error correction circuits themselves. For example, means may be provided to compare the contents of register 30 and 40 to detect a register stage failure and to prevent an erroneous correction.

While the invention has been particularly shown and described with reference to preferred embodiments thereof, it will be understood by those skilled in the art that the foregoing and other changes in form and details may be made therein without departing from the spirit and scope of the invention.

We claim:

1. In combination with memory storing multibyte words of data in an error correction code and an associated system operating on words not in said code, the improvement comprising;

register means for receiving a word read from said memory and for receiving marked bytes of a word from said associated system, any marked bytes from said associated system and any unmarked bytes from said memory constituting a word to be stored;

first means connected to said register means to receive said word to be stored to form error correction bits for said word to be stored;

second means connected to said register means to receive said word read from said memory and to correct errors in said memory word and to correct any corresponding error in an unmarked byte of said word to be stored; and and third means connected to be responsive to said second means to change the error correction code bits in said register means according to a corrected error.

2. The improvement of claim 1 in which said error correction bit forming means includes circuits to form error correction bits distinct from data bits in said word to be stored.

3. In combination with a memory storing multibyte data words in an error correction code and operating with an associated system supplying words or marked bytes of words not in said error correction code for store and partial store operations, the improvement comprising, store register means connected to receive marked data bytes from said associated system, and error correction encoding means connected to receive the word in said store register means and to provide to said store register means an error correction encoded word for storage in said memory;

fetch register means connected to receive both marked and unmarked bytes from said memory, and means for correcting an error in said fetch register and in any corresponding unmarked byte in said store register means; and means responsive to said error-correcting means to update the error correction code in said store register means when a data correction is made in said store register.

4. The improvement of claim 3 further including a parity generator connected to receive data in said fetch register means and to provide a parity bit for each byte, a register connected to receive said parity bits, and means responsive to said error correcting means to complement the stage of said parity register corresponding to the byte in which an error is located.

5. The improvement of claim 3 in which said error-correcting encoding means includes circuits to form error correction code bits distinct from data bits.

6. The improvement of claim 5 in which said error-correcting means includes an exclusive OR circuit forming syndrome bits according to the data and error correction code bits of said fetch register means, and further includes means for decoding said syndrome bits to locate any error bit position and to detect predetermined uncorrectable errors.

7. The improvement of claim 6 in which said means to update said error correction bits comprises logic circuits connected to said decoding means according to the relationship of data bits to error correction code bits in the error correction code.

8. The improvement of claim 6 in which said syndrome decoding means includes means providing intermediate outputs according to logical combinations of selected syndrome bits and other intermediate outputs according to logical combinations of other syndrome bits, and said update means includes means logically combining said intermediate outputs according to the relationship between said check bits and the bit error location defined by said intermediate outputs.

9. The improvement of claim 5 in which said error correction means includes means responsive to a correction code bit error to inhibit an erroneous correction to any of said registers.

10. The improvement of claim 5 in which said encoding circuit includes means providing a single error correcting and double error detecting code and said error-correcting means includes means responsive to a single data bit error to perform an error correction and responsive to a double error to signal an uncorrectable error to said associated system, and to inhibit an invalid correction.